United States Patent
Kaku (10) Patent No.: US 10,084,624 B2
(45) Date of Patent: Sep. 25, 2018

(54) REPEATER

(71) Applicant: DENSO CORPORATION, Kariya, Aichi-pref. (JP)

(72) Inventor: Yoshifumi Kaku, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/419,180

(22) Filed: Jan. 30, 2017

(65) Prior Publication Data

US 2017/0222843 A1   Aug. 3, 2017

(30) Foreign Application Priority Data

Feb. 3, 2016  (JP) .................................. 2016-19189

(51) Int. Cl.
| | | |
|---|---|---|
| *H04L 25/20* | (2006.01) | |
| *H04L 29/12* | (2006.01) | |
| *H04L 29/06* | (2006.01) | |
| *H04L 12/42* | (2006.01) | |
| *H04L 12/701* | (2013.01) | |

(52) U.S. Cl.
CPC .............. *H04L 25/20* (2013.01); *H04L 12/42* (2013.01); *H04L 45/00* (2013.01); *H04L 61/25* (2013.01); *H04L 69/22* (2013.01); *H04L 61/6022* (2013.01); *H04L 2012/421* (2013.01)

(58) Field of Classification Search
CPC ......... H04L 45/00; H04L 45/74; H04L 25/20; H04L 61/25; H04L 69/22; H04L 12/42; H04L 61/6022; H04L 2012/421; H04L 2001/0097; H04B 7/14; H04B 7/15
See application file for complete search history.

(56) References Cited

U.S. PATENT DOCUMENTS

| | | | | |
|---|---|---|---|---|
| 2008/0107027 | A1 | 5/2008 | Allan et al. | |
| 2012/0008491 | A1* | 1/2012 | Shimada | H04L 12/4633 370/218 |
| 2012/0072635 | A1* | 3/2012 | Yoshida | H04L 49/3027 710/306 |
| 2012/0207153 | A1* | 8/2012 | Yamasaki | H04L 25/14 370/357 |
| 2015/0281094 | A1* | 10/2015 | Kase | H04L 47/266 370/230 |

FOREIGN PATENT DOCUMENTS

JP    H05-260060 A    10/1993

* cited by examiner

*Primary Examiner* — Peter Chen
(74) *Attorney, Agent, or Firm* — Posz Law Group, PLC (57) ABSTRACT

A repeater receiving an original frame from a connected Electronic Control Unit (ECU) by a normal port divides data stored in a data area of the received frame, and each of a plurality of divided data pieces is stored in the data area in each of a plurality of division frames to be sent out to a destination. Each of the plurality of division frames of the original frame is distributed to one of two ring ports according to a determination of the repeater, and each of the division frames is sent out therefrom to the destination. In such manner, the frame transmission time required for a transmission of the frame is reduced.

14 Claims, 5 Drawing Sheets

| P1 | | P2 | | P3 | P4 |
|---|---|---|---|---|---|
| MAC ADDR. | HOPS | MAC ADDR. | HOPS | MAC ADDR. | MAC ADDR. |
| AD15 | 1 | AD15 | 3 | AD17 | AD18 |
| AD16 | 1 | AD16 | 3 | | |
| AD19 | 3 | AD19 | 1 | | |
| AD20 | 3 | AD20 | 1 | | |
| AD21 | 2 | AD21 | 2 | | |
| AD22 | 2 | AD22 | 2 | | |

| P1 | | P2 | | P3 | P4 |
|---|---|---|---|---|---|
| MAC ADDR. | HOPS | MAC ADDR. | HOPS | MAC ADDR. | MAC ADDR. |
| AD17 | 1 | AD17 | 3 | AD15 | AD16 |
| AD18 | 1 | AD18 | 3 | | |
| AD19 | 2 | AD19 | 2 | | |
| AD20 | 2 | AD20 | 2 | | |
| AD21 | 3 | AD21 | 1 | | |
| AD22 | 3 | AD22 | 1 | | |

FIG. 4

| P1 | | P2 | | P3 | P4 |
|---|---|---|---|---|---|
| MAC ADDR. | HOPS | MAC ADDR. | HOPS | MAC ADDR. | MAC ADDR. |
| AD15 | 1 | AD15 | 3 | AD17 | AD18 |
| AD16 | 1 | AD16 | 3 | | |
| AD19 | 3 | AD19 | 1 | | |
| AD20 | 3 | AD20 | 1 | | |
| AD21 | 2 | AD21 | 2 | | |
| AD22 | 2 | AD22 | 2 | | |

REPEATER

CROSS REFERENCE TO RELATED APPLICATION

The present application is based on and claims the benefit of priority of Japanese Patent Application No. 2016-019189, filed on Feb. 3, 2016, the disclosure of which is incorporated herein by reference.

TECHNICAL FIELD

The present disclosure generally relates to a repeater used in a communication network.

BACKGROUND INFORMATION

In an Ethernet network, a ring shape topology of a plurality of repeaters, i.e., Ethernet "switches" or network switches, is arranged by connecting those repeaters in a ring shape. In such a ring shape topology of the repeaters, or the switches, two ports of one switch are respectively connected to ports of two other (i.e., two different) switches, for a ring shape topology of communication path arrangement of the network. Thus, as a result, two communication paths are established between the two switches, one communication path along a clockwise direction of the ring shape network and the other communication path along a counter-clockwise direction, from one (sender) switch to the other (receiver/destination) switch.

More practically, the following situation clarifies the above description. That is, when one switch has at least four ports, among which two ports are ring ports for a ring connection of the subject switches, and the other two ports are normal ports that are respectively connected to two devices (e.g., when one of the two normal ports of a switch 1 is connected to a device A (e.g., ECU X) and one of the two normal ports of a switch 2 is connected to a device B (e.g., ECU Y)), one data communication frame transmitted from the device A reaches the device B in either of the two communication paths described above, because (path A) the transmitted frame from the device A may come in from one normal port of the switch 1 to go out from one ring port of the switch 1 to take a clockwise path to reach the switch 2 and to go out from one normal port to the device B, and (path B) the transmitted frame from the device A may come in from one normal port of the switch 1 to go out from the other ring port of the switch 1 to take a counter-clockwise path to reach the switch 2 and to go out from the same normal port to the device B. In other words, two communication paths, i.e., the path A and the path B, are provided for communication between the two devices A and B.

On the other hand, a patent document, WO 2010-509825, (Patent document 1) discloses an idea of transferring the frame in a predetermined shortest path to the destination, i.e., from one node to the other node.

When the Ethernet network is used to form a ring topology of the devices, one data communication frame may either be sent out to take (i) both of the two paths in the ring topology to reach the destination device or (ii) only one of the two paths in the ring topology to reach the destination device. In either case, the transmission time of one data communication frame is bound/affected by the communication speed of the one path.

SUMMARY

It is an object of the present disclosure to provide a method and a communication device to reduce a frame transmission time of the Ethernet network communication.

In one aspect of the present disclosure, a repeater is used in a communication network that is organized as a connection of a plurality of subject repeaters. Each of the plurality of subject repeaters includes a plurality of ports respectively sending out and receiving a frame, an address table registering an address of a connected device that is connected to each of the plurality of ports, and a communication controller (i) transferring, from a receiving port to a transfer destination port in the repeater, a received frame received by the receiving port among the plurality of ports with reference to the address table, the transfer destination port of the received frame determined based on a registration in the address table, the registration in the address table registering an address of a destination device included in the received frame, and (ii) sending out the frame from the transfer destination port. The plurality of subject repeaters are connected to make a ring-shape communication network, each of the plurality of subject repeaters connecting two specific ports among the plurality of ports with other repeaters, (a) a first one of the two specific ports of the subject repeater connected to a specific port of a first other repeater and (b) a second one of the two specific ports of the subject repeater connected to a specific port of a second other repeater. Each of the plurality of subject repeater includes a data divider dividing original data into a plurality of divided data pieces, when the frame is received from the connected device that is connected to a normal port of the subject repeater, the original data stored in a data area of the received frame. Each of the plurality of subject repeater also includes a frame generator generating a plurality of division frames and storing each of the plurality of divided data pieces in the data area of each of the plurality of division frames, when the original data is divided by the data divider. Further, each of the plurality of subject repeater includes a frame distributor distributing the plurality of division frames generated by the frame generator to one of the two specific ports by determining which division frame is to be distributed to which one of the two specific ports. Also, each of the plurality of subject repeater includes a sender sending out each of the plurality of division frames from one of the two specific ports determined by the frame distributor.

Thereby, the data amount in one communication path is reduced. Thus, the repeater of the present disclosure can reduce the transmission time required for a transmission of the frame to the destination device.

The numerals in the parentheses in claims simply point to examples of the components in the embodiments, thereby not limiting the scope of the claims in any manner.

BRIEF DESCRIPTION OF THE DRAWINGS

Objects, features, and advantages of the present disclosure will become more apparent from the following detailed description made with reference to the accompanying drawings, in which.

DETAILED DESCRIPTION

An embodiment of the present disclosure is described with reference to the drawings.

Figure 1:
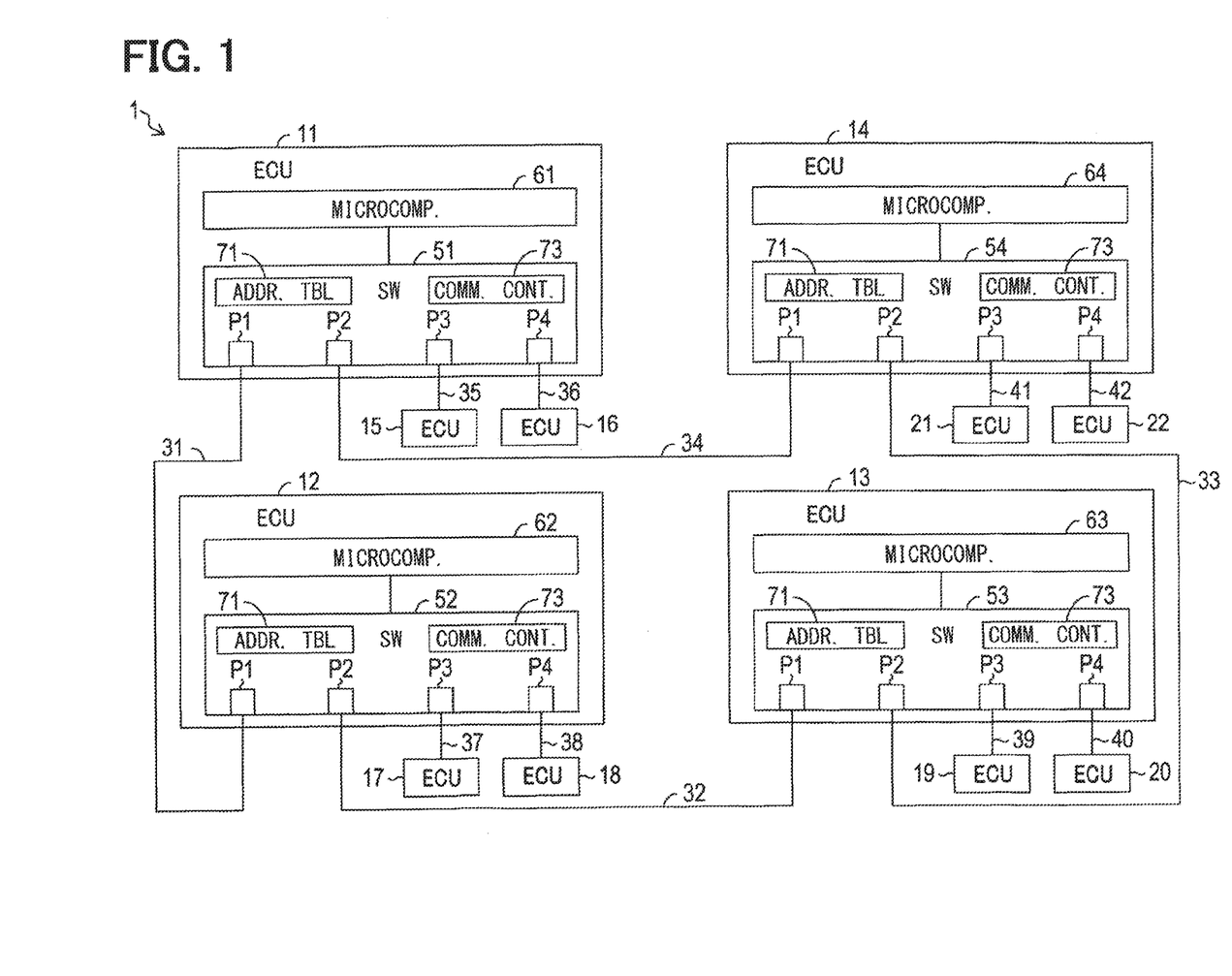
FIG. 1 is a schematic diagram of a configuration of a communication network in an embodiment of the present disclosure.

A communication network 1 is an Ethernet network disposed in, for example, vehicles, e.g., in passenger vehicles, and, as shown in FIG. 1, and is provided with Electronic Control Units (ECU) 11-22, and communication lines 31-42.

The ECUs 11, 12, 13, and 14 are provided with Ethernet switches 51, 52, 53, and 54, respectively. The Ethernet switches 51-54 are network switches which respectively function as a repeater that relays communication between the other ECUs 15-22.

The ECUs 11, 12, 13, and 14 are provided with microcomputers 61, 62, 63, and 64, respectively. The microcomputers 61-64 are provided with a Central Processing Unit (CPU), a Read-Only Memory (ROM), a Random Access Memory (RAM), and the like (not illustrated). The various functions of the microcomputers 61-64 are realized when CPU executes a program stored in a non-transitive and substantive recording medium. In the present disclosure, ROM corresponds to the non-transitive substantive recording medium for storing the program.

The method corresponding to the program is performed by the execution of the program. The number of microcomputers in each of the ECUs 11-14 may be only one or more than one.

The switches 51-54 are layer 2 switches, for example, and perform communication for relay, i.e., transmission of data, according to the Ethernet standard.

Thus, the switch 51 is provided with four ports P1, P2, P3, P4, for transmitting and receiving a frame, a Media Access Control (MAC) address table 71, and a communication controller 73 that performs communication processing according to the Ethernet standard for the relay of the frames.

The switches 52, 53, and 54 are also provided with the ports P1, P2, P3, P4, the MAC address table 71, and the communication controller 73 just like the switch 51.

Operation of the switches 51-54 is operation realized by, i.e., under control of, the communication controller 73.

In the communication network 1, a port P1 of the switch 51 of the ECU 11 and a port P1 of the switch 52 of the ECU 12 are connected by the communication line 31, and a port P2 of the switch 52 of the ECU 12 and a port P1 of the switch 53 of the ECU 13 are connected by the communication line 32.

Further, a port P2 of the switch 53 of the ECU 13 and a port P2 of the switch 54 of the ECU 14 are connected by the communication line 33, and a port P1 of the switch 54 of the ECU 14 and a port P2 of the switch 51 of the ECU 11 are connected by the communication line 34.

Further, ports P3 and P4 of the switch 51 of the ECU 11 are connected to the ECUs 15 and 16 via the communication lines 35 and 36, respectively, and ports P3 and P4 of the switch 52 of the ECU 12 are connected to the ECUs 17 and 18 via the communication lines 37 and 38, respectively. Further, ports P3 and P4 of the switch 53 of the ECU 13 are connected to the ECUs 19 and 20 via the communication lines 39 and 40, respectively, and ports P3 and P4 of the switch 54 of the ECU 14 are connected to the ECUs 21 and 22 via the communication lines 41 and 42, respectively.

That is, in other words, each of the switches 51-54 has its ports P1, P2 connected to the ports P1, P2 of the other switches 51-54, for establishing a ring topology of the communication network. The ring topology may be re-phrased as a ring/loop shape. The ports P3, P4 not used for establishing the ring topology are connected to the ECUs 15-22 that respectively serve as a communication node.

Therefore, as a communication path between the switches 51 and 54, there are two paths starting from the switch 51, for example. That is, a clockwise path from the switch 51 to the switch 54 and a counter-clockwise path from the switch 51 via the switches 52, 53 to the switch 54 are available. Thus, the two paths described above serve as two, different communication paths for communication between two of the ECU 15-22 that are connected to respectively different switches 51-54.

Note that, in the following description, the ports P1 and P2 among the ports P1 to P4 of the switches 51-54 that are used for a ring shape connection may also be designated as a ring port, respectively. The ring ports P1 and P2 respectively correspond to an example of a specific port.

Further, the ports P3 and P4 other than the ring ports, i.e., the port not used for the ring shape connection, may also be designated as a normal port.

Figure 2:
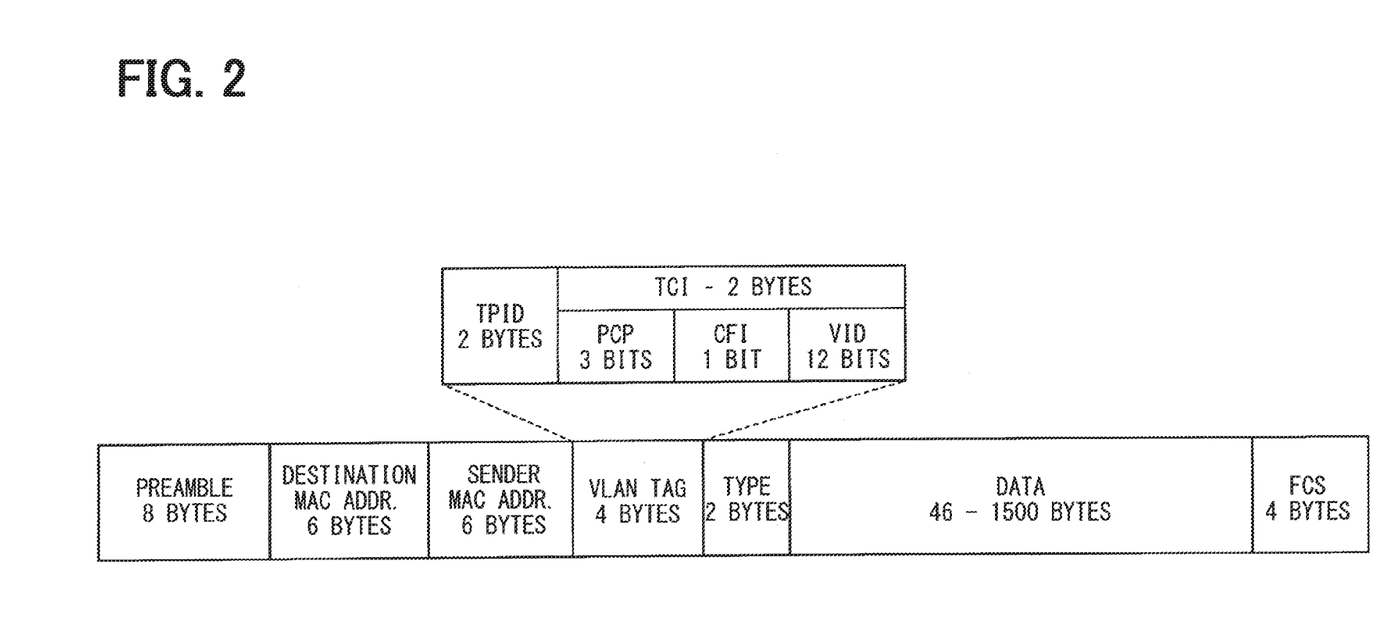
FIG. 2 is a diagram of a configuration of an Ethernet frame.

The frame communicated in the communication network 1 is provided with many areas, as shown in FIG. 2. That is, there are a preamble area, a destination MAC address area, a sender MAC address area, a Virtual Local Area Network (VLAN) tag area, a type area, a data area, and a Frame Check Sequence (FCS) area, for example, as shown in FIG. 2.

The destination MAC address area stores a MAC Address (i.e., a destination MAC address) of a destination device of the frame.

The sender MAC address area is a MAC Address (i.e., a sender MAC Address) of a sender device of the frame.

The former half, i.e., 2 bytes, of the VLAN tag area is a Tag Protocol Identifier (TPID), and the latter half, i.e., also 2 bytes, of the VLAN tag area is a Tag Control Information (TCI). The TCI includes three bits of Priority Control Point (PCP), one bit of Canonical Format Indicator (CFI), and 12 bits of VLAN Identifier (VID).

According to the present embodiment, VID in the VLAN tag area is, for example, used for a storage area of distribution information described later. The MAC address table 71 of each of the switches 51-54 stores, i.e., registers, a MAC address of the connected device for each of the ports, i.e., for each of the four ports. That is, for example, the MAC address of an ECUn is represented as "ADn" in FIGS. 3 and 4 and in the following description, in which "n" is a suffix of natural numbers.

Figure 3:
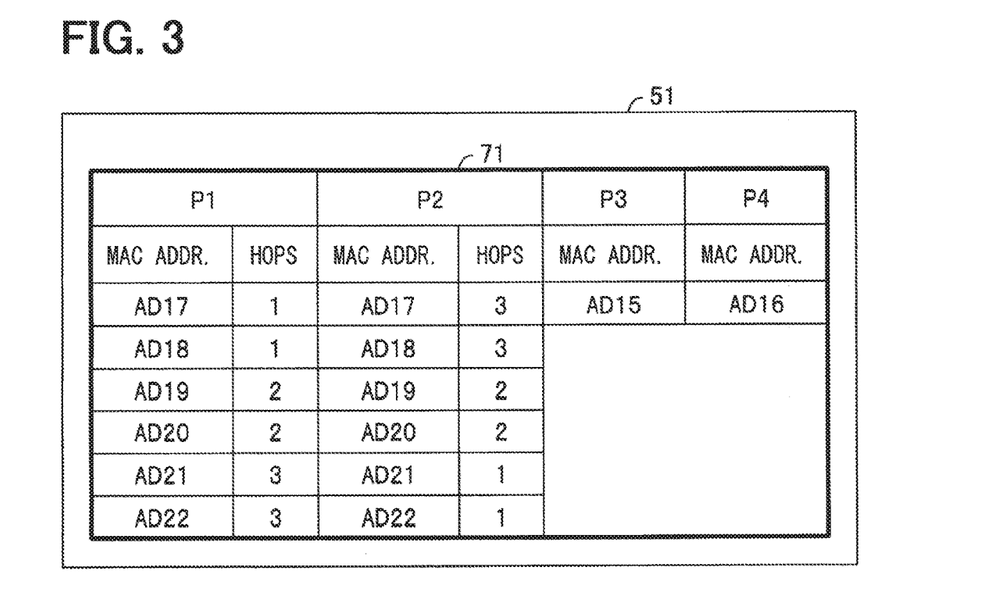
FIG. 3 is a diagram of an example of a MAC address table.

That is, as shown in FIG. 3, in the MAC address table 71 of the switch 51, "AD15" that is the MAC address of the ECU 15 is registered for the normal port P3, and "AD16" that is the MAC address of the ECU 16 is registered for the normal port P4.

Further, for each of the ring ports P1 and of P2, "AD17"-"AD22" that are the MAC addresses of the ECUs 17-22 connected to the normal ports P3 and P4 of the other switches 52-54 are registered in the table 71 of the switch 51. This is because the ECUs 17-22 are connected, via the other switches 52-54, to the ring ports P1 and P2 of the switch 51.

Figure 4:
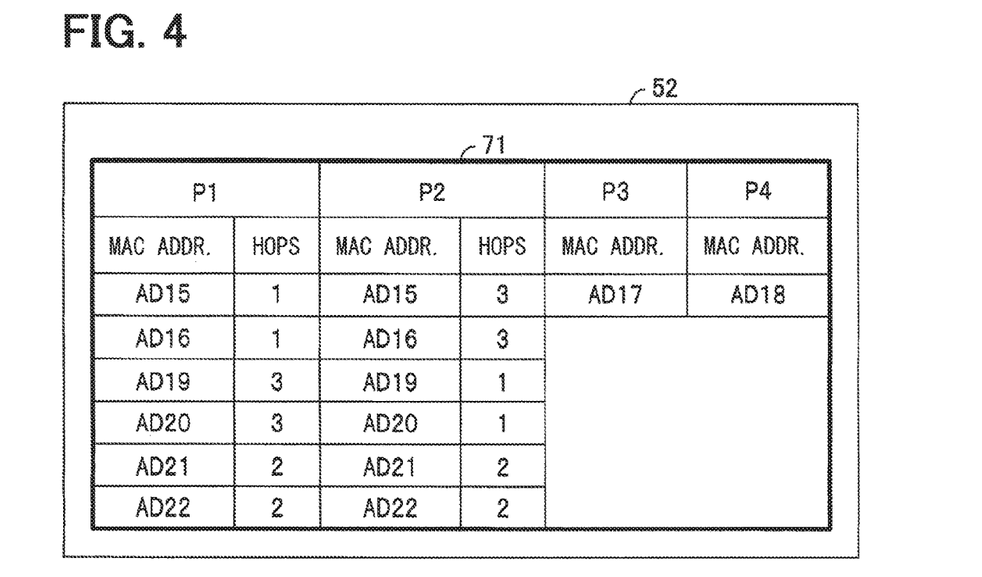
FIG. 4 is a diagram of another example of the MAC address table.

Further, for example, as shown in FIG. 4, in the MAC address table 71 of the switch 52, "AD17" that is the MAC address of the ECU 17 is registered for the normal port P3, and "AD18" that is the MAC address of the ECU 18 is registered for the normal port P4.

Further, for each of the ring ports P1 and P2, "AD15", "AD16", and "AD19"-"AD22" that are the MAC addresses of the ECUs 15, 16, 19-22 connected to the normal ports P3 and P4 of the other switches 51, 53, and 54 are registered in the table 71 of the switch 52.

Furthermore, in the MAC address table 71 of each of the switches 51-54, the hop number is also registered as the additional information associated with the MAC address for each of the ring ports P1 and P2.

The hop number is the registered information about how many "hops", i.e., how many other devices, a frame transmitted from a ring port of a switch must pass through to reach a destination ECU. The destination ECU in such case means an ECU that has the registered MAC address associated with the hop number concerned in the table 71.

For example, as shown in FIG. 3, in the MAC address table 71 of the switch 51, for "AD17" and "AD18" that are registered for the ring port P1, "1" is registered as a hop number in association therewith. This is because there is one switch 52 existing in the communication path from the ring port P1 of the switch 51 to the ECU 17 or to the ECU 18 among the switches 51-54 connected in a ring shape.

On the other hand, for "AD17" and "AD18" that are registered for the ring port P2, "3" is registered as a hop number. This is because there are three switches 52-54 existing in the communication path from the ring port P2 of the switch 51 to the ECU 17 or to the ECU 18 among the switches 51-54 connected in a ring shape.

In the MAC address table 71 of the switch 51, "3" is registered as a hop number to "AD21" and "AD22" that are registered for the ring port P1. This is because there are three switches 52-54 existing in the communication path from the ring port P1 of the switch 51 to the ECU 21 or to the ECU 22.

On the other hand, for "AD21" and "AD22" that are registered for the ring port P2, "1" is registered as a hop number. This is because there is one switch 54 existing in the communication path from the ring port P2 of the switch 51 to the ECU 21 or to the ECU 22.

In the MAC address table 71 of the switch 51, "2" is registered as a hop number to "AD19" and "AD20" that are registered for the ring port P1. This is because there are two switches 52 and 53 existing in the communication path from the ring port P1 of the switch 51 to the ECU 19 or to the ECU 20.

Also, "2" is registered as a hop number to "AD19" and "AD20" that are registered for the ring port P2. This is because there are two switches 53 and 54 existing in the communication path from the ring port P2 of the switch 51 to the ECU 19 or to the ECU 20.

The communication controller 73 in each of the switches 51-54 has a frame transfer function described below.

The communication controller 73 determines, upon receiving a frame by one of the ports P1 to P4, a transfer destination port of the received frame, based on (i) the destination MAC address in the received frame and (ii) the MAC address table 71.

More specifically, the communication controller 73 determines whether the same MAC address as the destination MAC address in the received frame is registered in the MAC address table 71 regarding ports P1 to P4, except for a frame-receiving port by which the subject frame is received.

The communication controller 73 then determines a port for which the same MAC address as the destination MAC address in the received frame as a transfer destination port with reference to the MAC address table 71. If the same MAC address as the destination MAC address in the received frame is not registered in the MAC address table 71, the communication controller 73 determines all other ports other than the frame-receiving port as the transfer destination port. Then, the communication controller 73 transmits, i.e., sends out, the received frame from the transfer destination port.

The communication controller 73 in each of the switches 51-54 registers, upon receiving a frame by either one of the ports P1 to P4, the number of the port by which the received frame is received and the sender MAC address in the received frame in an associated manner in the MAC address table 71. This function is known, in general, as a MAC address learning function.

Therefore, in each of the switches 51-54, if the frame is received by either of the port P3 or the port P4, the sender MAC address in that, i.e., subject, frame is registered in the MAC address table 71 for the port by which the received frame is received.

For example, when the ECU 15 connected to the normal port P3 of the switch 51 transmits a frame, as shown in FIG. 3, the MAC address (i.e., AD15) of the ECU 15 is registered in the MAC address table 71 of the switch 51 for the port P3.

In the communication network 1 configured in the above-described manner, the communication controller 73 of each of the ECUs 11-14 performs a send-out process and a reception process mentioned below. Note that the function performed by each of the ECUs 11-14 may be partially or may be entirely performed by only one Integrated Circuit (IC) or by a plurality of ICs, in a hard-wired manner.

First, the send-out process is described.

The send-out process is a process that is repeatedly performed when the ECUs 11-14 are in operation.

Figure 5:
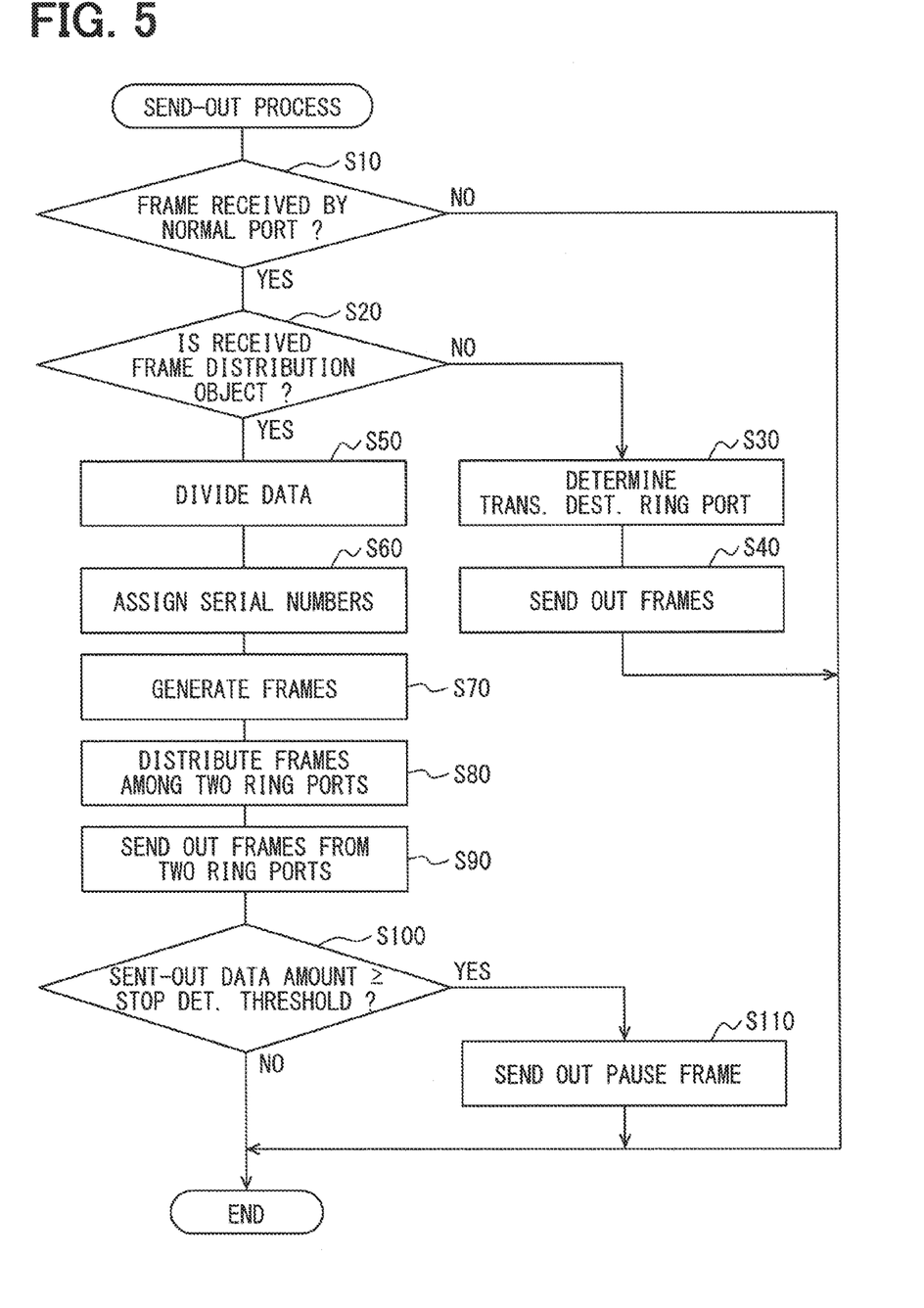
FIG. 5 is a flowchart of a transmission process.

When the send-out process is performed, the communication controller 73 determines whether a frame is received by the normal port P3 or by the normal port P4 in S10, as shown in FIG. 5.

Here, when a frame is not received by the normal port P3 or by the normal port P4, the send-out process is once ended.

On the other hand, when a frame is received by the normal port P3 or by the normal port P4, it is determined in S20 whether the received frame is a distribution object. More practically, the distribution information is extracted from VID of the VLAN tag area of the received frame, and, it is determined whether the received frame is a distribution object, i.e., is to be divided, based on the extracted distribution information. The distribution information is information indicative of whether the subject frame is a distribution object.

When each of the ECUs 15-22 generates a frame for transmission, it is determined whether the frame to be transmitted is a distribution object, and a determination result regarding whether the frame is a distribution object or not is stored in VID of the VLAN tag area of the transmitted frame.

Here, when the received frame is not a distribution object, based on the destination MAC address in the received frame and the MAC address table 71, a transfer destination ring port of the received frame is determined in S30.

Then, in S40, the received frame is transmitted, i.e., sent out, from the transfer destination ring port, and the send-out process is once ended.

Further, when the received frame is determined as a distribution object in S20, then, in S50, the data stored in the data area of the received frame is divided into data pieces of a preset data amount.

Then, in S60, to each of the divided data pieces, a serial number is assigned, as an order of the arrangement of the divided data pieces in the data area. The serial numbers are integer numbers, i.e., 0, 1, 2, 3, and the like, equal to or greater than zero, for example. Further, the last one of the divided data pieces having the largest serial number among the divided data pieces has final data information further assigned thereto.

Then, in S70, the frame is generated for each of the divided data pieces. More specifically, for each of the divided data pieces, an above-described frame, i.e., a frame having the preamble area, the destination MAC address area, the sender MAC address area, the VLAN tag area, the type area, the data area, and the FCS area, is generated. The same information as the received frame is stored in the destination MAC address area and in the sender MAC address area. The same distribution information as the received frame is stored in VID of the VLAN tag area. The divided data piece and the serial number are stored in the data area. Note that, in the data area where the divided data piece having the largest serial number assigned thereto is stored, the final data information is also stored. Hereafter, each of the plurality of frames generated in S70 is designated as a division frame.

In S80, the plurality of generated division frames are distributed either to the ring port P1 or to the ring port P2 (i.e., the division frames are distributed among two ring ports P1, P2). More practically, a transfer destination port of the frames having even serial numbers may be determined as the ring port P1, and a transfer destination port of the frames having odd serial numbers may be determined as the ring port P2.

Next, in S90, the plurality of division frames are sent out in order from the transfer destination ring ports determined in S80.

Then, in S100, a data amount of the plurality of division frames (i.e., a sent-out data amount, hereafter) generated in S70 is determined as to whether the sent-out data amount is equal to or greater than a preset stop determination threshold. The value of the preset stop determination threshold may be set according to a storage capacity of a transmission buffer provided in each of the switches 51-54, which is provided for temporarily storing the division frames that are sent out from the ring ports P1 and P2. The value of the stop determination threshold may be set to a greater value when the storage capacity of the transmission buffer is large.

When the sent-out data amount is less than the stop determination value, the send-out process is once ended. On the other hand, when the sent-out data amount is equal to or greater than the stop determination value, in S110, a pause frame is sent out from a normal port that has received a frame in S10, for instructing a stop of frame transmission. In such manner, when an ECU receives a pause by the normal port, the ECU temporarily stops to send out a frame. Then, after a completion of transmission of the pause frame in S110, the send-out process is once ended.

Next, the procedure of the reception process is described.

The reception process is a process that is repeatedly performed when the ECUs 11-14 are in operation.

Figure 6:
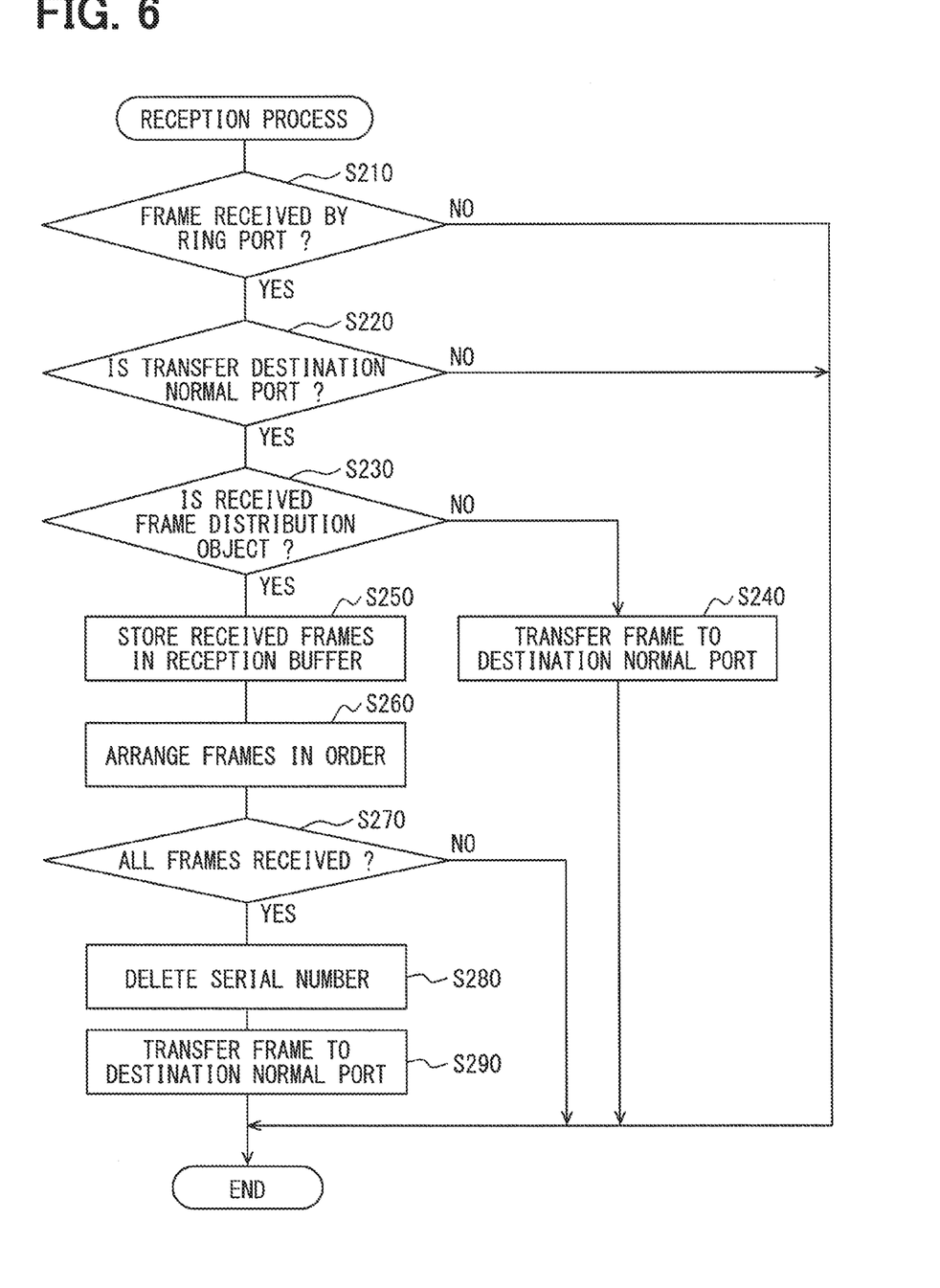
FIG. 6 is a flowchart of a reception process performed by the communication controller of the switch.

When the reception process is performed, the communication controller 73 determines whether a frame is received by the ring port P1 or by the ring port P2 in S210 first, as shown in FIG. 6. When a frame is not received by the ring port P1 or by the ring port P2, the reception process is once ended.

On the other hand, when a frame has been received by the ring port P1 or by the ring port P2, based on the destination MAC address in the received frame and the MAC address table 71, it is determined in S220 whether the transfer destination of the received frame is one of the normal port P3 or the normal port P4.

When the transfer destination is not the normal port P3 or the normal port P4, the reception process is once ended.

On the other hand, when the transfer destination is the normal port P3 or by the normal port P4, it is determined in S230 whether the received frame is a distribution object, just like in S20.

When the received frame is not the distribution object, a transfer destination normal port of the received frame is determined in S240 based on the destination MAC address in the received frame and the MAC address table 71, and the received frame is sent out from the transfer destination normal port, and the reception process is once ended.

When the received frame is determined as a distribution object in S230, the received frame is stored in a reception buffer provided in each of the switches 51-54 in S250, which is provided for storing the received frames.

Then, in S260, the divided data piece and the serial number stored in the data area of the received frame are extracted as extraction data, and the extraction data is arranged in order according to the serial number.

Then, in S270, it is determined whether all the division frames are received. More specifically, it is determined whether the following two conditions are satisfied.

The first condition is that, among the received frames stored in the reception buffer, a frame having the final data information assigned thereto together with the serial number is found (i.e., a frame having the largest serial number).

The second condition is that, all integer numbers between zero and the largest serial number are found as the serial numbers of the received frames that are stored in the reception buffer.

That is, in other words, when the divided data piece having the serial number of each of zero to the largest is found in the reception buffer, it is determined that all division frames are received.

When it is determined that all division frames are not received, the reception process is once ended.

On the other hand, when it is determined that all the division frames are received, in S280, the serial number is deleted from the extraction data that has been arranged in order in S260 (henceforth, ordered data).

Then, in S290, based on the destination MAC address in the received frame and the MAC address table 71, the transfer destination normal port of the received frame is determined, and the ordered data, which is arranged in order and has the serial number deleted therefrom in S280, is sent out from the transfer destination normal port, and the reception process is once ended.

The communication network 1 configured in such manner is provided with the switches 51, 52, 53, 54 which respectively have the ports P1, P2, P3, P4, the MAC address table 71, and the communication controller 73.

The communication network 1 is provided as a ring shape connection of the switches 51, 52, 53, 54, i.e., is formed as a ring of the switches respectively connecting the ring ports P1, P2 with each other.

The switches 51-54 are used respectively as each of the plurality of repeaters in the communication network 1.

The ports P1 to P4 are used for transmitting and receiving the frame.

The MAC address table 71 registers an address of each of the ECUs 15-22 which are connected, directly or indirectly, to the ports P1 to P4.

The communication controller 73 determines, upon receiving a frame by one of the ports P1 to P4, a transfer destination port of the received frame, as a port (i) other than the frame receiving port that has received the received frame and (ii) for which the same MAC address as the destination MAC address in the received frame as a transfer destination port with reference to the MAC address table 71.

Then, the communication controller 73 transmits, i.e., sends out, the received frame from the transfer destination port.

Then, the switches 51-54 respectively divide the data stored in the data area of the received frame into the plurality of divided data pieces, upon receiving the frame from the ECUs 15-22 connected to the normal port P3 or to the normal port P4 which are different from the ring port P1 and the ring port P2.

The switches 51-54 then generate the division frames, each of the plurality of division frames storing in the data area each of the plurality of divided data pieces.

The switches 51-54 then respectively distribute a transfer destination of each of the plurality of division frames to one of the ring ports P1, P2 by determining the transfer destination port of each of the plurality of division frames as the ring port P1 or as the ring port P2.

The switches 51-54 then respectively transmit, i.e., send out, each of the plurality of division frames from the ring port P1 or from the ring port P2 determined in the above.

Thus, the switches 51-54 distributes the plurality of division frames among the first communication path from one of the two ring ports, i.e., from the ring port P1 to the destination MAC address and the second communication path from the other of the two ring ports, i.e., from the ring port P2 to the destination MAC address. In such manner, the sent-out data amount in one communication path is reduced. Therefore, the switches 51-54 of the present disclosure can shorten/reduce the time required to transmit a frame to the destination MAC address.

Further, the distribution information which shows whether the frame is to be distributed is included in the frame. Then, upon receiving a frame, the switches 51-54 respectively determine, based on the distribution information contained in the received frame, whether to divide the data stored in the data area of the frame, and, when it is determined to divide the data, the data is divided. Thereby, the switches 51-54 can appropriately distinguish a division-required frame from a division-not-required frame. That is, unnecessary operation to divide the division-not-required frame is avoided.

The switches 51-54 respectively assign the serial number to each of the plurality of divided data pieces, for showing a pre-division arrangement order of those data pieces. Then, the switches 51-54 respectively generate the division frames, including not only the divided data piece but also the serial number.

Thereby, the switches 51-54 can easily distinguish the arrangement order of each of the divided data pieces in the plurality of division frames with reference to the serial numbers in the division frames.

Further, the switches 51-54 respectively store the received division frames in the reception buffer temporarily, when the destination MAC address included in the division frame received by the ring port P1 or P2 specifies one of the normal ports P2 and P3 as the transfer destination.

Further, the switches 51-54 respectively arrange an order of the plurality of the division frames stored in the buffer based on the serial numbers in those division frames.

Then, the switches 51-54 respectively transmit, i.e., send out, the plurality of division frames arranged in order from the normal port corresponding to the destination MAC address included in the division frames.

That is, since the switches 51-54 respectively send out the plurality of division frames from the normal port after arranging the order of the division frames, the ECU on the receiving side, i.e., receiving the frames from the switches 51-54, does not have to perform a division frame arrangement process to arrange the order of the division frames according to the serial numbers. Thus, the switches 51-54 can reduce the processing load of the ECU receiving those frames.

Further, the switches 51-54 respectively delete the serial number from the plurality of division frames after arranging the order of the frames. Thereby, the ECU receiving those frames from the switches 51-54 can omit a serial number deleting process for deleting the serial number. Thus, the switches 51-54 can reduce the processing load of the ECU receiving those frames.

Further, the switches 51-54 respectively transmit, i.e., send out, a pause frame from the normal port that is connected to the ECU transmitting a frame when the data amount of the plurality of division frames, i.e., the sent-out data amount, is equal to or greater than the preset stop determination threshold. The pause frame instructs the frame-transmitting ECU to stop transmission of the frame. In such manner, the switches 51-54 respectively are enabled to control a buffer overflow situation, i.e., can avoid/prevent a transmission of the frame that has an amount of data exceeding the storage capacity of the transmission buffer.

In the embodiment described above, the ECUs 15-22 correspond to a connected device in the claims, the MAC address table 71 corresponds to an address table in the claims, the destination MAC address corresponds to an address of a destination device in the claims, and the switches 51-54 correspond to a repeater in the claims, and the ring ports P1 and P2 correspond to a specific port in the claims.

Further, the process in S50 corresponds to a data divider in the claims, the process in S70 corresponds to a frame generator in the claims, the process in S80 corresponds to a frame distributor in the claims, and the process in S90 corresponds to a sender in the claims.

Further, the process in S20 corresponds to a division determiner in the claims, the serial number corresponds to order information in the claims, the process in S60 corresponds to an information assigner in the claims, the process in S250 corresponds to a storer in the claims, the process in S260 corresponds to an arranger in the claims, and the process in S290 corresponds to a transferer in the claims.

The process in S280 corresponds to a deleter in the claims, the pause frame corresponds to a stop instruction in the claims, the process in S110 corresponds to a stop instructor in the claims.

Although the present disclosure has been described in connection with preferred embodiment thereof with reference to the accompanying drawings, it is to be noted that various changes and modifications will become apparent to those skilled in the art.

Modification 1

For example, although the number of the ECUs is 12, the number of the switches is 4 and the number of ports is 4 in the above-mentioned embodiment, those numbers may be different in other embodiments.

Modification 2

Although, in the above-mentioned embodiment, the switches 51-54 respectively arrange an order of the divided data pieces in S260, and respectively delete the serial numbers in S280, the process in both of S260 and S280 may be performed by each of the ECUs 15-22, or the process of S280 only may be performed by each of the ECUs 15-22.

Further, a function of one component in the above embodiments may be distributed to many components, and vice versa.

Further, a part of the above embodiment may be replaced with a well-known configuration in the art, or may be omitted.

Further, any configuration derivable from the language in the present disclosure, especially in claims, is within the scope of the present disclosure.

The present disclosure may further be realized/implemented in various forms, such as a system of having the above-described switches 51-54, a program for controlling a computer to serve as the switches 51-54, a storage medium storing such a program, a method of relaying a frame or the like.

Such changes, modifications, and summarized schemes are to be understood as being within the scope of the present disclosure as defined by appended claims.

What is claimed is:

1. A repeater for use in a communication network that is organized as a connection of a plurality of subject repeaters, each of the plurality of subject repeaters comprising:
   a plurality of ports, each of the plurality of ports respectively configured to send out and receive a frame;
   an address table configured to register an address of a connected device that is connected to each of the plurality of ports; and
   a communication controller (i) configured to transfer, from a receiving port to a transfer destination port in the repeater, a received frame received by the receiving port among the plurality of ports with reference to the address table, the transfer destination port of the received frame determined based on a registration in the address table, the registration in the address table registering an address of a destination device included in the received frame, and (ii) further configured to send out the frame from the transfer destination port, wherein
   the plurality of subject repeaters are connected to make a ring-shape communication network, each of the plurality of subject repeaters connecting two specific ports among the plurality of ports with other repeaters, (a) a first one of the two specific ports of the subject repeater connected to a specific port of a first other repeater and (b) a second one of the two specific ports of the subject repeater connected to a specific port of a second other repeater, wherein the specific ports of the plurality of ports are connected to the other repeaters as part of the ring-shape communication network, wherein a normal port of the plurality of ports is not used for the ring-shape communication network and is directly connected to the connected device, and wherein the communication controller is further configured to:
   determine whether the frame is received from the connected device that is connected to the normal port of the subject repeater;
   divide original data into a plurality of divided data pieces, when the frame is determined to be received from the connected device that is connected to the normal port of the subject repeater, the original data stored in a data area of the received frame;
   generate a plurality of division frames and storing each of the plurality of divided data pieces in the data area of each of the plurality of division frames, when the original data is divided;
   distribute the plurality of division frames to one of the two specific ports by determining which division frame is to be distributed to which one of the two specific ports; and
   send out each of the plurality of division frames from one of the two specific ports.

2. The repeater of claim 1
   wherein the communication controller is further configured to determine whether to divide the data stored in the data area of the received frame according to distribution information that is included in the frame, and divide the data upon determining a division of the data, the distribution information indicative of whether the frame is a distribution object.

3. The repeater of claim 2, wherein the distribution information used to determine whether to divide the original data is stored in a VLAN tag area of the frame, and the distribution information indicates whether the received frame is to be divided into a plurality of frames for distributed transmission.

4. The repeater of claim 1 wherein the communication controller is further configured to
   assign order information indicative of a pre-division arrangement order to each of the plurality of divided data pieces, and
   generate the plurality of division frames respectively having the order information that is assigned by the communication controller, in addition to the divided data piece.

5. The repeater of claim 4 further comprising:
   a buffer configured to store the frame,
   wherein the communication controller is further configured to
   temporarily store, in the buffer, the received division frame, when the transfer destination port in the subject repeater is the normal port, in a situation in which the address of the destination device in the received division frame received by the specific port of the subject repeater is the address of the connected device connected to the normal port of the subject repeater;
   arrange an order of the plurality of the division frames stored in the buffer based on the order information in each of the plurality of division frames; and
   transfer the order-arranged plurality of division frames to the transfer destination port for sending out the order-arranged plurality of division frames from the transfer destination port to the destination device.

6. The repeater of claim 5
   wherein the communication controller is further configured to delete the order information from each of the plurality of division frames that have already been arranged.

7. The repeater of claim 1
   wherein the communication controller is further configured to stop the send out of the frame by sending out a stop instruction from the normal port to the connected device when a data amount of the plurality of division frames sent out is equal to or exceeding a preset stop determination amount.

8. A repeater for use in a communication network, comprising:
   a plurality of ports, each of the plurality of ports respectively configured to send and receive a frame;
   an address table configured to register an address of a connected device that is connected to each of the plurality of ports; and
   a communication controller configured to control the plurality of ports to respectively send and receive the frame, the communication controller further configured to:
      determine whether the frame is received from the connected device that is connected to a normal port of the repeater, wherein the normal port of the plurality of ports is directly connected to the connected device;
      divide original data into a plurality of divided data pieces, when the frame is determined to be received from the connected device that is connected to the normal port of the repeater, the original data stored in a data area of the received frame;
      generate a plurality of division frames and store each of the plurality of divided data pieces in the data area of each of the plurality of division frames, when the original data is divided;
      distribute the plurality of division frames to one of two specific ports of the plurality of ports by determining which division frame is to be distributed to which one of the two specific ports, wherein the specific ports are connected to other repeaters in the communication network; and
      send out each of the plurality of division frames from one of the two specific ports determined by the communication controller.

9. The repeater of claim 8
   wherein the communication controller is further configured to determine whether to divide the data stored in the data area of the received frame according to distribution information that is included in the frame, and divide the data upon determining a division of the data, the distribution information indicative of whether the frame is a distribution object.

10. The repeater of claim 9, wherein the distribution information used to determine whether to divide the original data is stored in a VLAN tag area of the frame, and the distribution information indicates whether the received frame is to be divided into a plurality of frames for distributed transmission.

11. The repeater of claim 8 wherein the communication controller is further configured to
   assign order information indicative of a pre-division arrangement order to each of the plurality of divided data pieces, and
   generate the plurality of division frames respectively having the order information that is assigned by the communication controller, in addition to the divided data piece.

12. The repeater of claim 11 further comprising:
   a buffer configured to store the frame,
   wherein the communication controller is further configured to
      temporarily store, in the buffer, the received division frame, when a transfer destination port in the repeater is the normal port, in a situation in which the address of a destination device in the received division frame received by the specific port of the repeater is the address of the connected device connected to the normal port of the repeater; and
      arrange an order of the plurality of the division frames stored in the buffer based on the order information in each of the plurality of division frames; and
      transfer the order-arranged plurality of division frames to the transfer destination port for sending out the order-arranged plurality of division frames from the transfer destination port to the destination device.

13. The repeater of claim 12
   wherein the communication controller is further configured to delete the order information from each of the plurality of division frames that have already been arranged.

14. The repeater of claim 8
   wherein the communication controller is further configured to stop the send out of the frame by sending out a stop instruction from the normal port to the connected device when a data amount of the plurality of division frames sent out is equal to or exceeding a preset stop determination amount.

* * * * *